Figure 1:
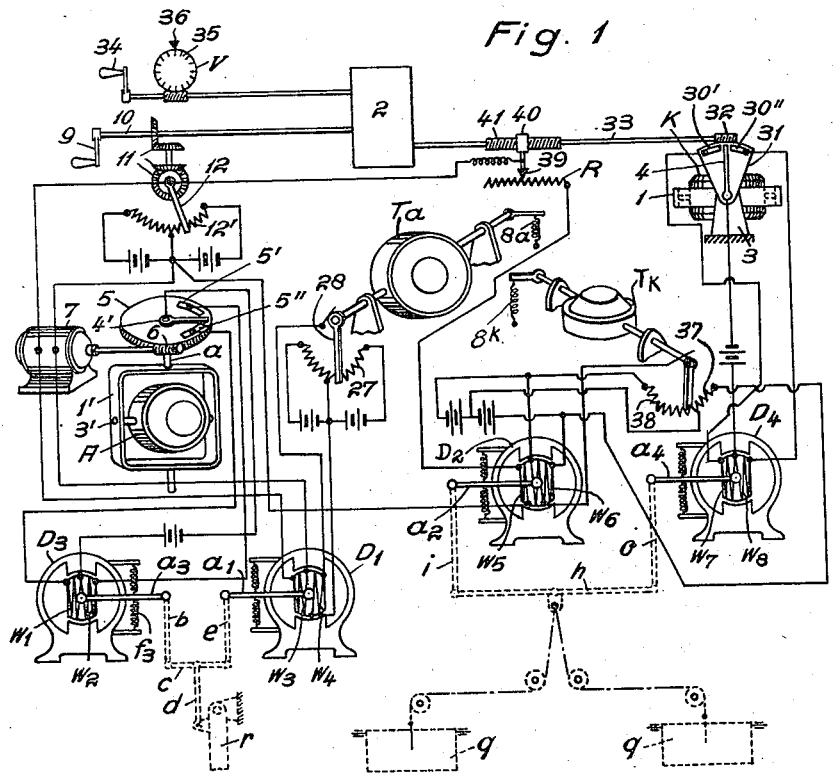

Feb. 13, 1940.  J. THIRY  2,190,390

AUTOMATIC STEERING DEVICE FOR AIRCRAFT

Filed April 9, 1938

Inventor
Johannes Thiry
By Stephen Cerstvik
Attorney

Patented Feb. 13, 1940

2,190,390

UNITED STATES PATENT OFFICE 2,190,390

AUTOMATIC STEERING DEVICE FOR AIRCRAFT

Johannes Thiry, Berlin-Südende, Germany, assignor to Siemens Apparate und Maschinen Gesellschaft mit beschrankter Haftung, Berlin, Germany, a corporation of Germany Application April 9, 1938, Serial No. 201,163 In Germany April 9, 1937

11 Claims. (Cl. 244—77)

The invention relates to self-steering devices for aircraft.

The flight in the curve is properly performed if the normal axis of the airplane is in the apparent vertical. The apparent vertical may be obtained from the direction of the resultant of the acceleration of gravity and the centrifugal acceleration. The angle between the apparent vertical and the true vertical which represents the angle of bank of the airplane is determined by the formula $$\tan \varphi = \frac{v \cdot \omega}{g}$$

where $\varphi$ is equal to the angle of bank, $v$ to the speed of flight, $\omega$ to the turning speed of the airplane and $g$ to the acceleration of gravity.

The turning speed of the airplane may be chosen by the pilot at will and is adjusted depending upon the time during which a certain change of direction of the airplane is to be performed. The speed of flight is a given magnitude which under circumstances may also be varied. Since the acceleration of gravity is constant the angle of bank is consequently a function of two magnitudes which may be both chosen or of which one is known and the other may be chosen at will.

In self-steering devices for airplanes in which, for instance, a directional gyro is employed as an absolute direction indicating device, a change of course may be brought about by the fact that the pick-off part of the control device operated by the gyro is adjusted by hand and the airplane is thereby turned until the zero position of the control device is attained. The duration of the flight in a curve may be determined by the speed of the adjustment just described. The radius of the curve is a function of the turning speed of the airplane. The duration of the flight in a curve and the radius of the curve are dependent upon the speed with which the pick-off of the control device operated by the gyro is adjusted.

With the use of a directional gyro alone a banking of the airplane on a curve, free of oscillations, is not possible. For damping the oscillations to be expected when an airplane banks on a curve, damping devices, for instance, a constrained gyro is provided. Such gyros, so-called gyroscopic turn indicators, operate in response to the turning speed about that axis which is perpendicular to their axis of rotation and that of precession. A rate of turn indicator measuring the angular speed about the normal axis of the airplane and operating in response thereto is utilized to counteract the change of course. This gyroscopic turn indicator would therefore exert a disturbing influence when it is desired to deliberately fly the airplane on a curve. To compensate for this disturbing influence of the turn indicator, an equal and opposite influence is exerted thereon so that no disturbance of the flight in the curve occurs. The gyro turn indicator may, for example be rendered ineffective during a curved flight by producing corresponding counter deflection of a control member coupled, for instance, with a rotary magnet.

The precession moment of the turn indicator measuring the angular speed about the normal axis is $M = C \cdot \omega \cos \varphi$, where C is a constant for the impulse of the gyro, $\omega$ the turning speed and $\varphi$ the angle of bank of the airplane. For the positions of flight important in practice the angle of bank is relatively small so that for such values of $\varphi$ the factor $\cos \varphi$ may be neglected, since it is approximately equal to 1. It is therefore sufficient to energize the rotary magnet which serves to equalize the precession moment brought about by the turn indicator measuring the angular speed about the normal axis of the airplane, in proportion to the turning speed alone, in which case $\varphi$ is neglected. This may be accomplished by varying the voltage supplied to the rotary magnet in accordance with the turning speed.

When the airplane flies on a curve it is to be remembered that in the case of an actuation of the rudder the airplane does not only turn about its normal axis. In the curve the transverse axis of the airplane is no longer horizontal but is inclined at an angle, the angle of bank, to the horizontal. If, for instance, an extreme case is considered where the airplane is inclined to such an extent as to be perpendicular on the wing it will be apparent that the axis of rotation of the airplane is no longer the normal axis but the transverse axis. From this consideration it follows that the flight in the curve represents a turn of the airplane both about the normal axis and about the longitudinal axis.

This fact is taken into consideration according to the invention by also compensating a second control influence of the turn indicator measuring the angular speed about the longitudinal axis. The precession moment of this turn indicator is $M' = C' \cdot \omega \sin \varphi$, where $C'$ is a constant for the impulse of this turn indicator, $\omega$ the turning speed and $\varphi$ the angle of bank of the airplane. A compensation of the precession deflection of this turn indicator may again be effected with the aid of a rotary magnet in which case, however, the angle of bank is not negligible.

Figure 2:
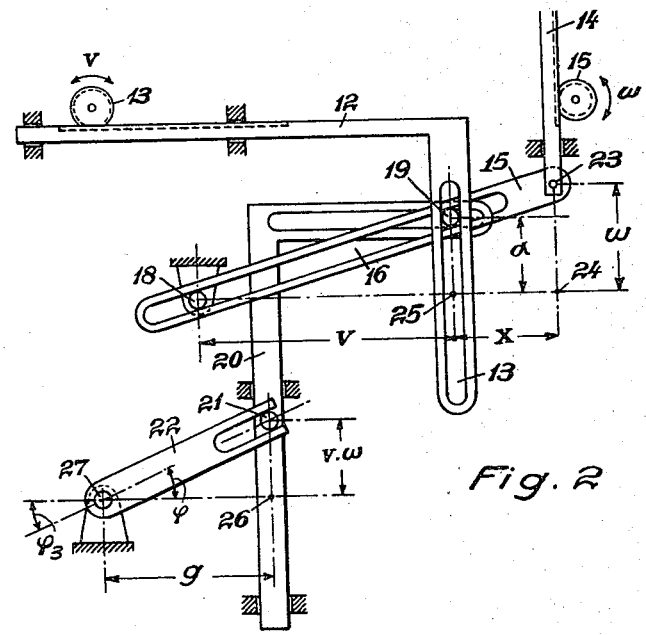

Referring to the drawing, Fig. 1 is a diagrammatic illustration of a system for automatically controlling the airplane about its vertical and its longitudinal axes; and Fig. 2 is a detailed view of one of the elements indicated diagrammatically in Fig. 1.

Referring to the drawing and more particularly to Fig. 1, K denotes a gyro having a vertical axis of rotation and so mounted as to serve as an artificial horizon. Gyro K is suspended in the usual manner in supports 3 by means of a Cardan ring 1. In this case the Cardan trunnions are mounted in the supports 3 only one of which is illustrated these being arranged on the airplane in the direction of the longitudinal axis of the airplane and carrying a contact arm 4 so that the deflections of the arm 4 correspond to the angle of bank of the airplane.

A is a directional gyro which is suspended in gimbal ring 1' for rotation about a horizontal axis provided by pivots 3'. The gimbal ring is mounted for rotation about axis $a$ carried by bearings fixed relatively to the airplane. To the axis $a$ of this gyro is secured a contact arm 4' cooperating with two counter contacts 5' and 5" secured to the casing 5. This casing 5 is rotatably mounted and is provided at its periphery with teeth meshing with a worm 6 driven by the motor 7.

$T_a$ and $T_k$ are gyroscopic turn indicators which measure the angular speed of the airplane about its normal axis and about its longitudinal axis respectively. To this end, each gyro is maintained in its zero position by means of springs $8a$ and $8k$ respectively. In the embodiment according to the invention the axis of rotation of the gyro $T_a$ is horizontal in its zero position and that of the gyro $T_k$ is perpendicular. The gyro $T_a$ measures therefore the angular speed of the airplane about its normal axis and the gyro $T_k$ the angular speed of the airplane about its longitudinal axis.

If the pilot desires to fly on a curve he adjusts the contact arm 12 of a potentiometer 12' by means of a handle 9, shaft 10 and bevel gears 11. The angular movement of handle 9 determines the angular movement of arm 12 which, in turn, controls the speed of rotation of motor 7 in proportion to the angular movement of handle 9. The speed of movement of motor 7 determines the turning speed of the craft, $\omega$, as follows: The motor 7 is so connected to the potentiometer 12' as to be operated at a speed corresponding to the magnitude and direction of the deflection of the contact arm 12 and rotates the casing 5 accordingly. The two windings $w_1$ and $w_2$ of the armature of an electric rotary magnet $D_3$ acting in opposition are connected to the contact device 4', 5' 5" in such a manner that the arm $a_3$ of this rotary magnet is rotated against the force of springs $f_3$ by an angle corresponding to the deflection of the contact arm 4' relative to the counter contacts 5' and 5" and therefore deflects the rudder $r$ through the rods $b$, $c$, $d$ by a corresponding angle in such a direction that the airplane rotates in a direction opposite to that of rotation of the casing 5 (i. e., it flies on a curve). The rudder $r$ is also controlled through the rods $e$ and $e_1$ by the rotary magnet $D_1$ one of whose armature windings $w_4$ is connected to the potentiometer 27 controlled by contact arm 28 secured to the precession axis of the gyroscopic turn indicator $T_a$. When the craft is maintained in straight flight and handle 9 is not actuated, coil $w_4$ will be energized upon any turning of the craft, to return the craft to its course. When the craft is deliberately put into a turn, coil $w_4$ alone would so actuate magnet $D_1$ as to oppose and counterbalance any effect of $D_3$ on the rudder. According to the invention however the armature of the rotary magnet $D_1$ is provided with a second winding $w_3$ which is connected to the same voltage as the motor 7 which varies with the rate of turn and thereby counteracts the effect of the winding $w_4$ so that when deliberately flying on a curve the arm $a_1$ of the rotary magnet $D_1$ does not deflect. Since the amount of deflection of the contact arm 12 determines the rate of turn, the voltage is so varied as to energize the winding $w_3$ to the same extent and in the opposite direction as the winding $w_4$ which is connected to the contact arm 28 which deflects in accordance with the turning speed of the airplane. In this manner the turn indicator $T_a$ will not prevent the rudder from being actuated during desired flight in a curve so that the airplane may follow the turn initiated by the motor 7 in a sufficiently rapid and accurate manner.

The ailerons $q$ are actuated through control ropes and a differential lever $h$, intermediate levers $i$ and $o$ by the arms $a_2$ and $a_4$ of two rotary magnets $D_2$ and $D_4$ whose armatures carry each two coils $w_5$ and $w_6$, $w_7$ and $w_8$ wound in opposite directions. The coils $w_7$ and $w_8$ are connected to the contact device 4, 30', 30". The contacts 30' and 30" are arranged on a sector 31 capable of being freely rotated about the Cardan axis of the gyro K, the sector 31 being provided at its periphery with teeth meshing with the worm 32. According to the invention the counter contacts 30' and 30" are displaced by means of the worm 32 with respect to the perpendicular main contact 4 for the duration of the flight in a curve by the angle $\varphi$ between the true and the apparent vertical. As already above mentioned this angle is proportional to the centrifugal acceleration resulting as a product of the aircraft speed $v$ and of the angular speed $\omega$ of the airplane. The shaft 33 is angularly adjusted in proportion to the product $v\omega$ since on the one hand it is adjusted by rotation of handle 9 whose rotation is proportional to the angular speed $\omega$ and on the other hand by the handle 34 which is adjusted angularly in proportion to $v$, the aircraft speed, by the use of a scale 35 so that the latter indicates the momentary speed of the airplane with respect to a fixed mark 36. The rotations of elements 9 and 34 are multiplied together by the mechanism of element 2 whereby movement of shaft 33 proportional to $v\omega$ is produced as will be described in detail later. If in this manner the counter contacts 30' and 30" are so displaced in accordance with the angle $\varphi$ it will be apparent that the ailerons will not be actuated by the gyro K controlling the rotary magnet $D_4$ as long as the airplane has, when flying on a curve, a lateral bank corresponding to this angle.

In order that the turn indicator $T_k$ may be prevented from actuating the ailerons through the rotary magnet $D_2$, due to the force exerted on the turn indicator when the airplane is flown on a curve, the magnet receives by the winding $w_5$ an excitation equal and opposite to that portion of the excitation of winding $w_6$ which is due to said turn, which winding is connected to the potentiometer 37 adjusted by the contact arm 38.

To produce the energization of the winding $w_5$ said winding is connected in generally the same manner as the winding $w_3$ of the rotary magnet $D_1$ to the potentiometer 12' so that it receives an energization proportional to the turning speed $\omega$.

In the circuit of the winding $w_5$ is, however, also inserted a sinusoidal resistor R whose slide 39 is adjusted by the nut 40 on a spindle 41 forming a part of the shaft 33. Since the variations in resistance 12' are proportional to ω and since the rotation of 33 is proportional to vω or to the angle φ it will be apparent that in this manner the energization of the winding $w_5$ is proportional to the value ω sin φ if the resistor R is sinusoidal that is its ohmic resistance does not vary linearly but as a sine function of the rotation of element 33 which determines the distance by which the spindle nut 40 is adjusted.

In the above-described manner the control influences of the two gyroscopic turn indicators $T_a$ and $T_k$ are compensated as is required to attain a proper flight in a curve.

The multiplier device represented schematically as element 2 of Fig. 1 will be now briefly explained. An example of such a multiplier whereby an effect proportional the product of $v$ and $\omega$ may be obtained as illustrated in Fig. 2. The slide 12 is shifted in accordance with the speed of flight $v$ by a pinion 13' which would be controlled by the crank 34 of Fig. 1. A second slide 14 is shifted in accordance with the angular speed ω by a pinion 15' which would be controlled by the crank 9 of Fig. 1. The slide 12 carries a guide 13, whereas a lever 15 provided with a slot guide 16 which is supported as indicated at 18, is rotatably mounted on the slide 14. A bolt 19 from which the movement of the slide 20 is derived engages in the guides 13 and 16. The slide 20 forms through the bolt 21 the drive of the lever 22. The distance 18—25 is proportional to the speed of flight $v$ and the distance 23—24=ω. Since the triangles 18, 23, 24 and 18, 19, 25 are similar the following proportions may be formed: $(v+x):\omega=x:\delta$. Since $v+x$ is a constant magnitude for example unity, $\delta=v.\omega$. If the distance 21—26=$v.\omega$ and the distance 27—26=$g$, the angle of bank φ is directly obtained through the tangent, i. e., the twist of the shaft 27 represents the desired result. Shaft 27 may be coupled to element 33 of Fig. 1.

The above-described type of a calculation device is only given by way of example, since there are other methods, whereby the angle of bank may be determined.

What is claimed is:

1. An automatic control device for aircraft and the like, comprising gyroscopic means for controlling said craft about one axis thereof, gyroscopic means for controlling said craft about a second axis thereof at right angles to said first axis, means responsive to the rate of turn of said craft about said first axis for producing a force to modify the control about said axis, means responsive to the rate of turn about said second axis for producing a force to modify the control about said second axis, means producing a force in opposition to the control force of said first responsive means and proportional to the rate of turn of said craft about said first axis, and means producing a force in opposition to the control force of said second responsive means and proportional to the product of the rate of turn about said first axis and a sine function of the angle of bank.

2. An automatic control system for a dirigible craft, comprising a control surface for controlling said craft with respect to a desired axis, means responsive to the deviations of said craft about said axis for controlling said surface, means responsive to the rate of turn of said craft about said axis for producing a force to control said surface, and means producing a force in opposition to said rate of turn control force and proportional to said rate of turn.

3. In an automatic control system for a dirigible craft, including means for controlling the orientation of said craft about a given axis thereof, the combination of means responsive to the deviation of said craft about said axis for producing a force proportional to said deviation, means responsive to the rate of turn about said axis for producing a force proportional to said rate of turn, means for applying said force to said control surface, and manually operable means for producing a force in opposition to said rate of turn force and proportional to said rate of turn.

4. In apparatus of the character described, means producing an electrical force proportional to the rate of deviation of a craft, means producing an electrical force proportional to the amount of deviation of said craft, a control surface, means applying said electrical forces to said control surface, and manually operable means producing a force for opposing said rate of deviation force and proportional to said rate of deviation.

5. An automatic control system for a dirigible craft, comprising a control surface for controlling said craft with respect to a desired axis, means responsive to the deviation of said craft about said axis for controlling said surface, means responsive to the rate of turn of said craft about said axis for producing a force to control said surface, manually operable control means for adjusting said deviation responsive means whereby the course of said craft may be altered, and means controlled by the operation of said manually controlled means for producing a force in opposition to the force produced by said rate of turn responsive means and proportional to the rate of turn produced by said manual means.

6. An automatic control system for a dirigible craft, comprising a control surface for controlling said craft with respect to a desired axis, means responsive to the deviation of said craft about said axis for controlling said surface, means responsive to the rate of turn of said craft about said axis for producing a force to control said surface, manually operable control means for adjusting said deviation responsive means with a force proportional to the product of a desired rate of turn about a chosen axis of said craft and the speed thereof, and means controlled by said manual means for producing a force in opposition to the force produced by said rate of turn responsive means and proportional to the product of the chosen rate of turn and the sine function of the angle of bank.

7. An automatic control system for a dirigible craft, comprising a control surface for controlling said craft with respect to a desired axis, means responsive to the deviation of said craft about said axis for controlling said surface, and manual control means for adjusting said deviation responsive means with a force proportional to the product of a desired rate of turn about a chosen axis of said craft and the speed thereof.

8. A control system for a dirigible craft, comprising a control surface for controlling said craft with respect to a desired axis, means responsive to the deviation of said craft about said axis for controlling said surface, means responsive to the rate of turn about said axis for producing a force to control said surface, a second control surface for controlling said craft with respect to an axis at right angles to said first axis, means responsive to the deviation of said craft about said second axis for controlling said second surface, means responsive to the rate of turn about said second axis for producing a force to control said second surface, manually operable means for adjusting said first responsive means to vary the course of said craft and to adjust said second responsive means with a force proportional to the product of a desired rate of turn of said craft about said first axis and the speed of said craft, and means controlled by said manual means for producing a force in opposition to the force of said first rate of turn responsive means and proportional to the rate of turn about said first axis and producting a force in opposition to the force produced by said second rate of turn responsive means and proportional to the product of the rate of turn about said first axis and the sinusoidal function of the angle of bank.

9. A control system for a dirigible craft, comprising a control surface for controlling said craft with respect to a desired axis, means responsive to the deviation of said craft about said axis for controlling said surface, means responsive to the rate of turn of said craft about said axis for producing a force to control said surface, a second control surface for controlling said craft with respect to an axis at right angles to said first axis, means responsive to the rate of turn of said craft about said second axis for producing a force to control said second surface, manually operable means for adjusting said second control surface, and means controlled by said manual means for producing a force in opposition to said second rate of turn force and proportional to the product of the rate of turn about said first axis and the sinusoidal function of the angle of bank.

10. A control system for a dirigible craft, comprising a control surface for controlling said craft with respect to a desired axis, means responsive to the rate of turn of said craft about said axis for producing a force to control said surface, manually operable means for controlling said surface, and means controlled by said manual means and producing a force proportional to the rate of turn of said craft and in opposition to the force produced by said rate of turn responsive means.

11. A control system for a dirigible craft, comprising a control surface for controlling said craft with respect to a desired axis, means responsive to the rate of turn of said craft about a chosen axis of said craft for producing a force for controlling said surface, and manually operable control means for controlling said surface and simultaneously applying a force in opposition to the force produced by said rate of turn responsive means and proportional to the product of the rate of turn of said craft about a desired axis and the sinusoidal function of the angle of bank.

JOHANNES THIRY.